United States Patent [19]
Mason, IV

[11] Patent Number: 5,343,369
[45] Date of Patent: Aug. 30, 1994

[54] LIGHT TABLE FOR TEACHING GEOMETRIC PRINCIPLES

[76] Inventor: Robert E. Mason, IV, 6700 192nd St., Apt. 512, Fresh Meadows, N.Y. 11365

[21] Appl. No.: 980,889

[22] Filed: Nov. 24, 1992

[51] Int. Cl.$^5$ ............................................. G01D 11/28
[52] U.S. Cl. ........................................ 362/33; 362/30; 362/97; 434/211
[58] Field of Search .................. 362/29, 30, 33, 97, 362/223, 224, 290, 234; 434/188, 201, 153, 211; 273/237, 309; 108/23

[56] References Cited

U.S. PATENT DOCUMENTS

| | | | |
|---|---|---|---|
| 1,981,646 | 11/1934 | Hamley | 434/211 |
| 2,034,529 | 3/1936 | Olsen | 362/97 |
| 2,378,249 | 6/1945 | Ruth | 362/31 |
| 2,935,598 | 5/1960 | Dempsey | 362/97 |
| 3,339,297 | 9/1967 | Stinn et al. | 273/239 |
| 3,356,839 | 12/1967 | Mehess et al. | 362/97 |
| 3,417,493 | 12/1968 | Drew | 434/11 |
| 4,058,912 | 11/1977 | Tacey | 434/211 |
| 4,330,813 | 5/1982 | Deutsch | 362/97 |
| 4,484,745 | 11/1984 | Sleeper | 273/309 |
| 4,631,643 | 12/1986 | Koster | 362/97 |
| 4,924,356 | 5/1990 | French et al. | 362/223 |
| 4,974,354 | 12/1990 | Hembrook, Jr. | 362/31 |

FOREIGN PATENT DOCUMENTS

| | | | |
|---|---|---|---|
| 1170171 | 5/1964 | Fed. Rep. of Germany . | |
| 2359236 | 6/1975 | Fed. Rep. of Germany | 273/237 |
| 1316699 | 7/1963 | France | 273/237 |

*Primary Examiner*—Ira S. Lazarus
*Assistant Examiner*—Y. Quach
*Attorney, Agent, or Firm*—Stroock, Stroock & Lavan

[57] ABSTRACT

A light table includes a housing extending in a horizontal direction having legs extending downwardly therefrom. The housing defines X- and Y-axes and has an X-Y grid pattern formed thereon and visible from above the housing. A lighting system is used to illuminate the grid pattern. A frame extends vertically upwards from the housing and defines a Z-axis having an X-Z grid pattern formed thereon. A second lighting system illuminates the grid pattern on the vertical frame.

6 Claims, 3 Drawing Sheets

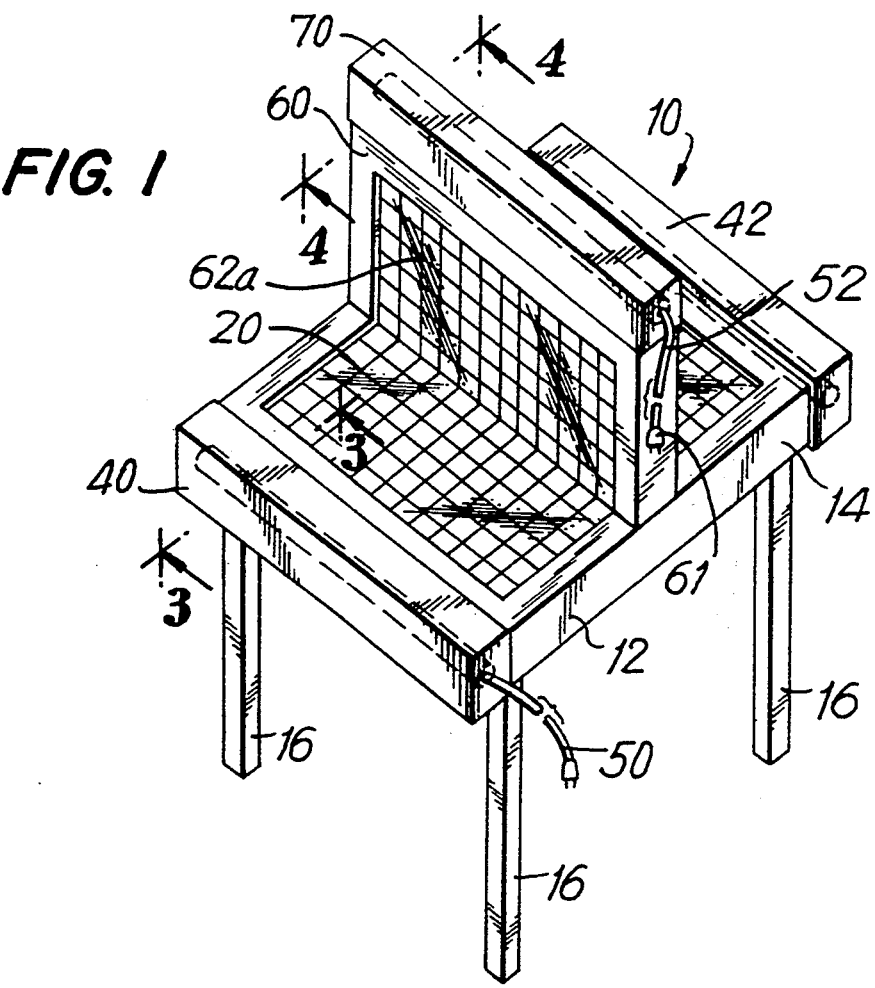

LIGHT TABLE FOR TEACHING GEOMETRIC PRINCIPLES

BACKGROUND OF THE INVENTION

The present invention is directed generally to a light table and, in particular, to a collapsible light table including horizontal and vertical surfaces with grids for use in teaching geometric principles to students.

Although we live in a three-dimensional world, students are formally taught the geometry of two-dimensional space. As an instructional tool, the Cartesian chalkboard is limited in that only two-dimensional objects are easily represented. A problem is posed when the teacher wants to represent three-dimensional objects such as a sphere, cube or pyramid which are often distorted on two-dimensional surfaces.

With the ever increasing importance of teaching students appropriate mathematical principles, including geometric applications, it is essential that appropriate teaching tools be developed and utilized. Accordingly, it is desired to provide a light table which readily assists in the teaching of three-dimensional geometric applications.

SUMMARY OF THE INVENTION

Generally speaking, in accordance with the present invention, a light table for use in teaching geometric applications to students is provided. The table includes a housing includes a horizontal surface extending in a horizontal direction having legs extending downwardly therefrom to support the housing above a floor. The housing extends along defined X and Y axes, and an X-Y grid pattern is formed on the horizontal surface and is visible from the top of the housing. A light system supported on the housing illuminates the grid pattern for greater effect. A frame extends vertically upwards from the housing and defines a Z axis. An X-Z grid pattern is formed on the frame. A second light system illuminates the X-Z grid pattern on the frame.

The table can be used to accurately represent and position objects in three-dimensional space defined by X, Y and Z coordinates. In a preferred embodiment, the frame extends upwardly from about the center of the horizontal housing, and the frame includes grid patterns on both sides thereof. The housing also includes the X-Y grid pattern on both portions on either side of the frame to readily represent three-dimensional space on positive and negative axes.

Accordingly, it is an object of the present invention to provide a light table used for teaching geometric principles to students.

A further object of the present invention is to provide an illuminated light table defining a horizontal surface with an X-Y axis grid pattern and a vertical surface with X-Z axis grid pattern.

Yet another object of the present invention is to provide a Tesian light table with collapsible legs to permit the table to be readily moved from classroom to classroom.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a light table constructed in accordance with a first embodiment of the present invention;

FIG. 2 is a bottom plan view of the light table of FIG. 1 shown with the legs in folded condition;

DESCRIPTION OF THE PREFERRED EMBODIMENTS

Reference is first made to FIGS. 1 and 2 of the drawings which depict a light table, generally indicated as 10, constructed in accordance with a preferred embodiment of the present invention. Light table 10 includes a table 12 having a housing 14 which extends in a horizontal direction. Light table 10 includes four downwardly depending legs 16 which support housing 14 above the floor on which legs 16 rest. As depicted in FIG. 2, legs 16 can be hingedly mounted to the underside of housing 14 to permit the legs to be folded thereunder to make the table readily transportable.

As depicted, housing 14 includes an X-axis and Y-axis grid pattern 20 on the horizontal surface thereof which is visible from above as depicted in FIG. 1. A grid pattern may also be visible from below as depicted in FIG. 2.

Figure 3:
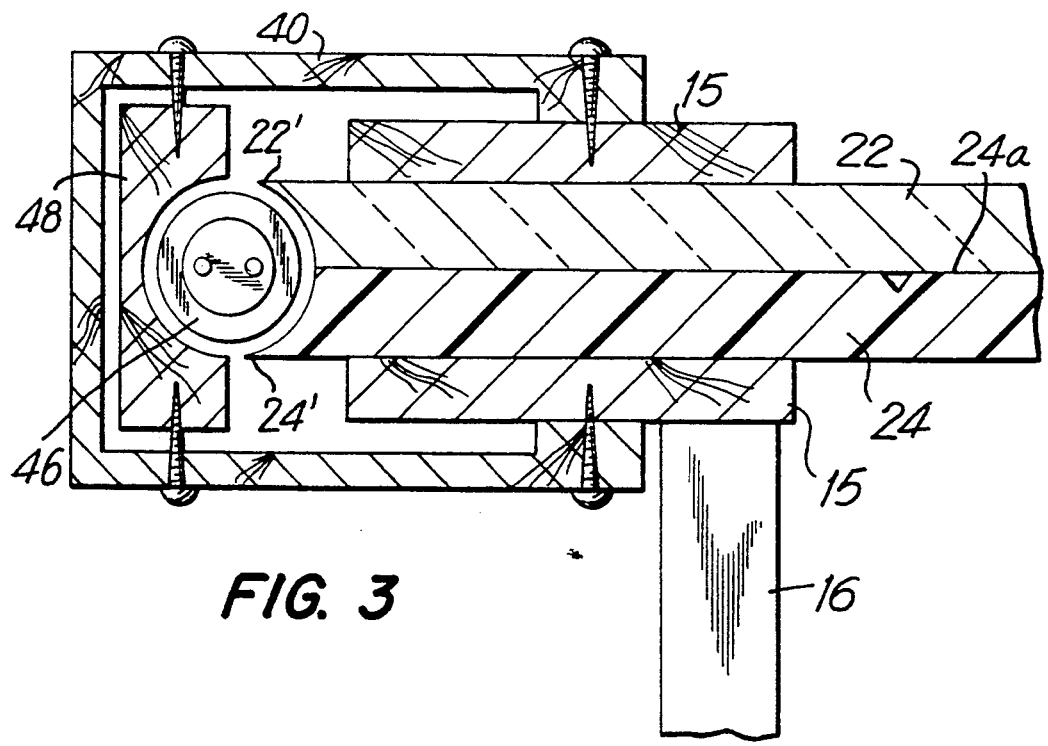
FIG. 3 is an enlarged sectional view taken along line 3—3 of FIG. 1.

Referring additionally to FIG. 3, it is noted that housing 14 includes an outer housing perimeter 15, preferably formed from wood, which supports an upper panel of transparent glass 22 and a lower panel of plastic material 24, such as a smoked Plexiglas-type material. The X-Y grid pattern 20 is formed on upper surface 24a of panel 24 and is visible through glass upper panel 22.

Similarly constructed lighting units 40 and 42 are provided at opposite ends of housing 14. Each lighting unit includes a light bulb, preferably a fluorescent tube 46 and an appropriate fixture 48, such as a fluorescent fixture. It is noted that ends 22' and 24' of glass panel 22 and plastic panel 24 are preferably concave to conform to the shape of bulb 46. This assists in illuminating the grid pattern. An electrical plug 50 extends from lighting unit 40.

When the lighting units are turned on, they will illuminate grid pattern 20 thereby giving greater definition to the coordinate plane defined and depicted thereby.

A frame 60 extends upwardly from a central portion of housing 14 and includes a third lighting unit 70 at the top thereof with an electrical plug 61. Frame 60 defines a Z-axis coordinate and includes an X-Z grid coordinate pattern 62a formed on one vertical surface thereof and a second X-Z grid coordinate pattern 62b formed on the opposite vertical surface thereof as referenced in FIG. 4 of the drawings. X-Z grid patterns 62a and 62b are calibrated to match the grid pattern on horizontal housing 14 so as to provide a continuous three-dimensional grid pattern in conjunction therewith on both sides of frame 60.

Figure 4:
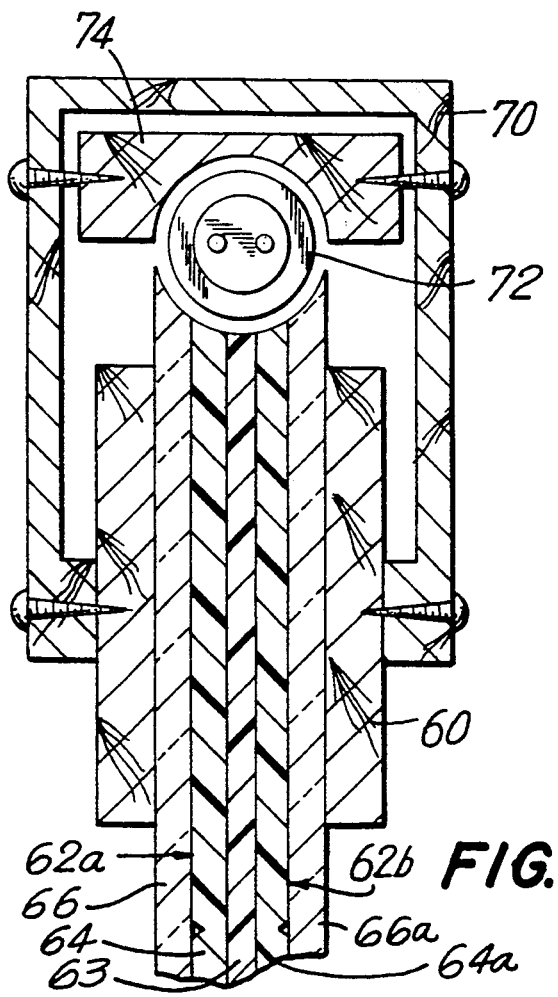
FIG. 4 is an enlarged sectional view taken along line 4—4 of FIG. 1.

As best depicted in FIG. 4, third light fixture 70 also includes a bulb, preferably a fluorescent tube 72, and an appropriate fixture 74 therefor. The light is used to illuminate both sides of the grid pattern formed on frame 60. The layered construction of frame 70 includes a central acrylic panel 63 having opposed acrylic panels 64 and 64a on opposite sides thereof which are engraved with the X-Z grid pattern. Outer glass panels 66 and 66a cover acrylic panels 64 and 64a, respectively. As depicted, the ends of each of the panels are concave to conform around fluorescent tube 72.

When illuminated, the grid pattern on both sides of the frame will be illuminated to provide the desired effect for teaching purposes.

Figure 5:
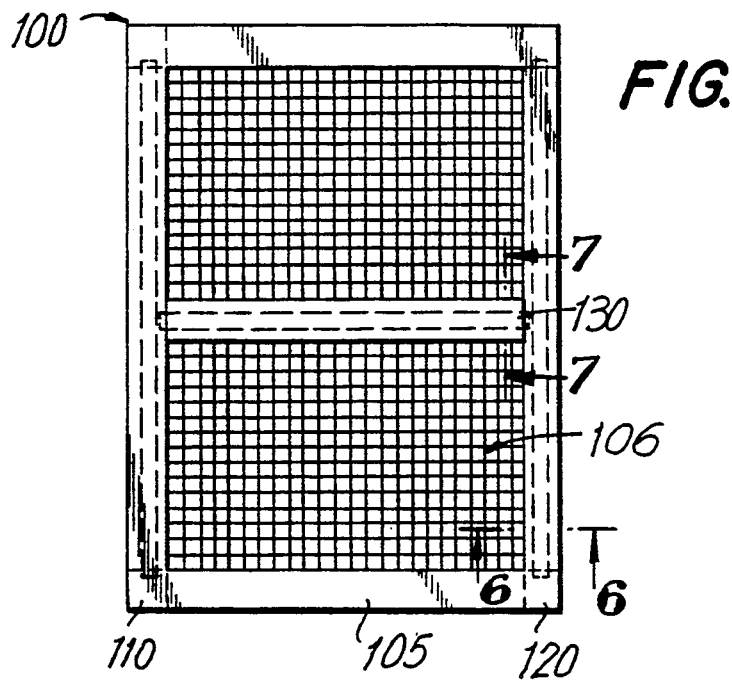
FIG. 5 is a top plan view of a light table constructed in accordance with an alternative embodiment of the present invention.
Figure 6:
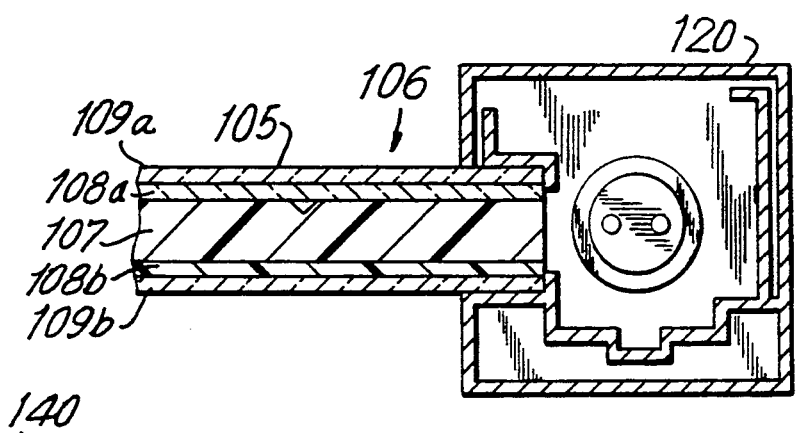
FIG. 6 is an enlarged sectional view taken along line 6—6 of FIG. 5.
Figure 7:
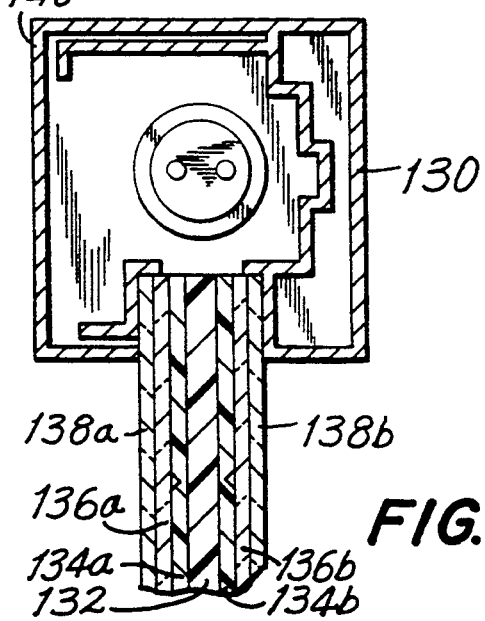
FIG. 7 is an enlarged sectional view taken along line 7—7 of FIG. 5.

FIGS. 5 through 7 depict an alternative embodiment of a light table, generally indicated as 100. In light table 100, fluorescent fixtures 110 and 120 extend along the longer sides of housing 105 in a direction perpendicular to upwardly extending frame 130. Instead of wood, the housing and frame are formed from extruded aluminum panels.

The horizontal surface 106 of housing 105 includes a central engraved plastic panel 107 sandwiched between opposing plastic panels 108a and 108b which themselves are sandwiched between opposing glass panels 109a and 109b. The plastic panel may be formed of an acrylic material.

Frame 130 extends upwardly from housing 105 and includes lighting fixture 140 at the top thereof. Frame 130 includes a central plastic panel 132 sandwiched between opposing engraved plastic panels 134a and 134b which themselves are sandwiched between plastic panels 136a and 136b and are topped with glass panels 138a and 138b, respectively. The plastic panels may be formed of an acrylic material.

This construction provides enhanced illumination and effect for the grid patterns.

In use, the legs 16 are open and the table is placed on an appropriate floor surface. After appropriate power is supplied, the grid surfaces will be illuminated and then the table can be used to represent, depict and place objects in three dimensional space. The very construction of the light table provides the necessary teaching apparatus.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. The light table as claimed in claim 1, A light table comprising a housing extending in a horizontal direction having legs extending downwardly therefrom to support said housing above a floor, said housing defining X- and Y axes, said housing including a glass panel and an engraved plastic panel having an X-Y grid pattern engraved thereon and visible from above said housing, first light means supported by said housing for illuminating said grid pattern, and a frame connecting to and extending vertically upwards from said housing, said frame defining a Z-axis and having another engraved plastic panel having an X-Z grid pattern formed thereon, and second light means supported on said frame for illuminating the X-Z grid pattern thereon, and said glass panel supported over said engraved plastic.

2. The light table as claimed in claim 1, wherein said other engraved plastic panel includes vertical surfaces on opposite sides thereof, each of said opposing surfaces including said X-Z grid pattern engraved thereon.

3. The light table as claimed in claim 2, wherein said frame extends upwardly from approximately a center of said housing, said X-Y grid pattern extending on both portions of said housing on opposite sides of said frame.

4. The light table as claimed in claim 1, wherein said legs are collapsible.

5. The light table as claimed in claim 1, wherein said first and second light means include fluorescent bulbs for illuminating the respective grid patterns.

6. The light table as claimed in claim 5, wherein said housing includes opposite ends, said first light means including a supporting light fixture on each of said opposite ends.

* * * * *